United States Patent [19]
Gehring

[11] 3,823,511
[45] July 16, 1974

[54] MEASURING DEVICE FOR SURFACES TO BE MACHINED ON MACHINE TOOLS

[75] Inventor: Christoph W. Gehring, Nellingen, Germany

[73] Assignee: Maschinenfabrik Gehring KG, Nellingen, Germany

[22] Filed: Sept. 15, 1971

[21] Appl. No.: 180,618

[30] Foreign Application Priority Data
Sept. 19, 1970 Germany............................ 2046358

[52] U.S. Cl.............. 51/34 R, 51/165.91, 33/178 R
[51] Int. Cl............................ B24b 7/00, B24b 9/00
[58] Field of Search....... 51/34 R, 34 H, 34 J, 34 C, 51/34 D, 165.91, 165.93; 33/178 R, 178 C, 178 E

[56] References Cited
UNITED STATES PATENTS
| | | | |
|---|---|---|---|
| 2,787,865 | 4/1957 | Gross | 51/34 C |
| 2,787,866 | 4/1957 | Gross | 51/165.93 X |
| 2,787,867 | 4/1957 | Klein | 51/165.91 X |
| 3,010,259 | 11/1961 | Greening | 33/178 R X |
| 3,059,381 | 10/1962 | Greening | 33/178 R X |

Primary Examiner—James L. Jones, Jr.
Attorney, Agent, or Firm—Walter Becker

[57] ABSTRACT

A measuring device for a machine tool, particularly a honing machine, which hones cylindrical surfaces in which the measuring device comprises a body concentric with the surface and have resilient fingers extending axially toward the surface with feeler elements on the free ends. The feeler elements have inclined ramps on the sides facing the surface and are pressed against the workpiece at the end of the surface. When the surface is machined to the proper size, the feeler elements move on to the surface and a switch is actuated to halt the machining operation. The feeler elements are moved axially toward the surface together with the tool and are halted at the surface and are then biased with the predetermined force against the end of the workpiece by a fluid pressure device.

9 Claims, 3 Drawing Figures

MEASURING DEVICE FOR SURFACES TO BE MACHINED ON MACHINE TOOLS

The present invention relates to a measuring device, especially for surfaces to be machined, especially cylindrical surfaces to be machined, such as surfaces of bores of work pieces, which device is to be used on machine tools especially honing machines with a feeling body provided on a holding device and movable in a direction parallel to the surfaces to be machined, said feeling body having a feeling member which moves onto the marginal area of the surface to be machined under a predetermined load and when the finish measurement has been reached, moves onto the surface to be machined.

With heretofore devices of the type involved, the feeling pressure at which the feeling body feels the bore of the workpiece is given by the weight of the feeling body and the parts pertaining to the device and possibly connected to the feeling body or the feeling pressure is determined by installed springs. The feeling body is designed for a certain diameter and when the workpiece bore has reached this diameter, the feeling body is automatically turned off and thus breaks off the machining operation within a range of less than one-thousandths of a millimeter tolerance.

In connection with mass fabrication, there arises again and again the requirement to machine a series of workpieces in groups of measurements for instance to hone the same while the diameter of said measurement groups differ only by a few thousandths of a millimeter from each other. This is the case for instance in the construction of internal combustion engines for automobiles where the pistons are combined in measurement groups and the cylinder bores are produced in corresponding measurement groups. This problem could not be solved satisfactorily heretofore by means of a mechanical measuring device of the above mentioned type.

It is, therefore, an object of the present invention to provide a device of the above mentioned type which while being simple in construction will furnish a precise final measurement result.

It is another object of this invention to provide a device as set forth in the preceding paragraph which will make it possible to precisely adjust the measuring device within such fine limits that for instance workpiece bores can be produced in a plurality of measurement groups.

These and other objects and advantages of the invention will appear more clearly from the following specification in connection with the accompanying drawings, in which.

Figure 1:
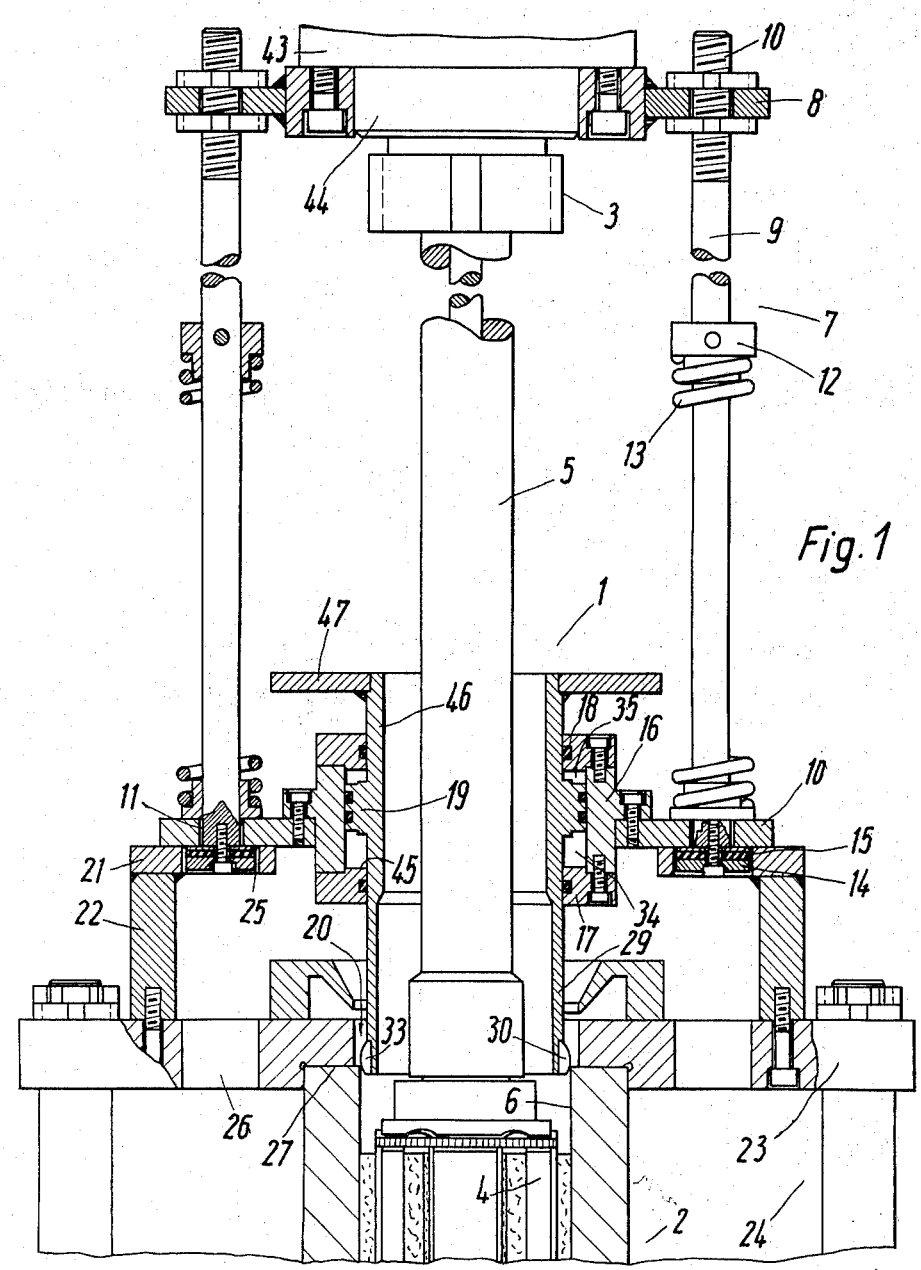
FIG. 1 is a vertical axial section through a measuring device according to the invention.

The measuring device according to the present invention is characterized primarily in that the feeler member is formed by a pressure spring loaded element which is movable in a direction transverse to the machining surface while the preloaded spring pressure acts in the direction toward the surface to be machined, said spring loaded elements preferably being provided at the end of a spring arm, preferably a leaf spring arm. In this way, the pressure load parallel to the surface to be machined and the pressure load acting in a direction transverse to the surface to be machined can be adjusted relative to each other in such a way that the feeler member will precisely at the obtainment of the desired measurement slide onto the surface to be machined and thereby indicates that the final measurement has been obtained. By slightly changing the relationship between the two pressure loads, it is possible while employing one and the same feeler body to set the device for the indication of another measurement by the measuring device while such a high precision can be secured that the second measurement differs from the first measurement only by one-thousandths of a millimeter.

With a particularly simple embodiment of the present invention, the feeler member is provided at the end of a spring arm, especially leaf spring arm, by means of which the spring load of the feeler member is determined in a direction transverse to the surface to be machined. For instance, the spring arm may in a simple manner be formed by slitting the in particular cylindrical feeler body, preferably in a direction parallel to its axis. Such cylindrical feeler body will be employed particularly for measuring the bores of workpieces.

In order to load the feeler member in a simple manner at high precision and parallel to the machining surface, this pressure load is effected pneumatically or hydraulically.

In order to change the respective measurement value indicated by the measuring device, it is expedient if the feeler pressure which is approximately parallel to the surface to be machined is variable, in such a way that the pressure acting transverse to the surface of the machine can always remain constant.

According to a preferred embodiment of the invention, the feeler body is directly connected to a piston which preferably forms one piece with the feeler body. The said piston is displaceable in a cylinder while preferably both cylinder chambers are connected to pressure conduits through the intervention of control devices so that by creating a corresponding differential pressure in the two cylinder chambers, the pressure load of the feeler member parallel to the surface to be machined is determined.

Particularly in connection with machine tools having rotatable or reciprocable tools as is the case for instance with honing machines, it is advantageous to design the feeler body and/or the piston as hollow bodies, especially as bushing so that the drive shaft, the shaft or the like of the tool may extend unimpededly through the feeler body or the piston, and the measuring action can be carried out during the machining of the workpiece.

For purposes of obtaining a precise centering, the feeler body is provided with at least three feeler members which are preferably uniformly distributed over the circumference and which may consist for instance of hard metal.

In order on one hand to obtain primarily constant distributions of the forces acting upon the feeler member, and instead on the other hand to obtain an easy sliding on the surface to be machined, the feeler member is provided with a feeler surface which increases in the feeling direction and preferably in the front range is conical and toward the rear adjacent thereto is crowned.

Particularly for the employment of the measuring device according to the invention in connection with honing machines, it is expedient to have the holding device provided with movable guiding means movable preferably with the machining tool, for the mounting of a support for the feeler member which is abutment limited, especially in the direction toward the workpiece. The feeler body is in its turn displaceably mounted on said support. The feeler body, in this way, will with each working stroke of the working tool be moved against the marginal area of the surface to be machined and is then at the predetermined pressure load pressed against the marginal area of the surface to be machined. During the return stroke of the tool, the guiding means in view of the abutment limitation, returns the support and thereby the feeler body so that the tool will be able unimpededly to move outwardly beyond the pertaining end of the surface to be machined. Expediently, the support for the abutment position relative to the guiding means is pressure loaded, especially spring pressure loaded, so that the starting position of the feeler body relative to the guiding means can be precisely determined, and during the return movement of the guiding means a cushioned movement of the support together with the guiding means will be effected. In order to be able to set the support with each stroke in its position corresponding to the feeler position and to do so at high precision, there is provided a stationary feeler abutment for the support with regard to the work piece. The guiding means is movable relative to said feeler position abutment independently of the latter so that the guiding means, after the support abuts the feeler end position abutment, can be advanced further with the tool while said support remains stationary.

If it is intended with the measuring device after obtaining the end measurement of the machining surface to initiate the finishing of the machining operation, the measuring device according to the invention may be further developed to form a control device in a simple manner by connecting an actuating element for a switch or the like to the feeler body.

The invention will now be described in detail while the drawings show an embodiment with the parts of the invention in an approximately natural size. These parts will be explained if their function is not directly clear from the drawing.

Figure 2:
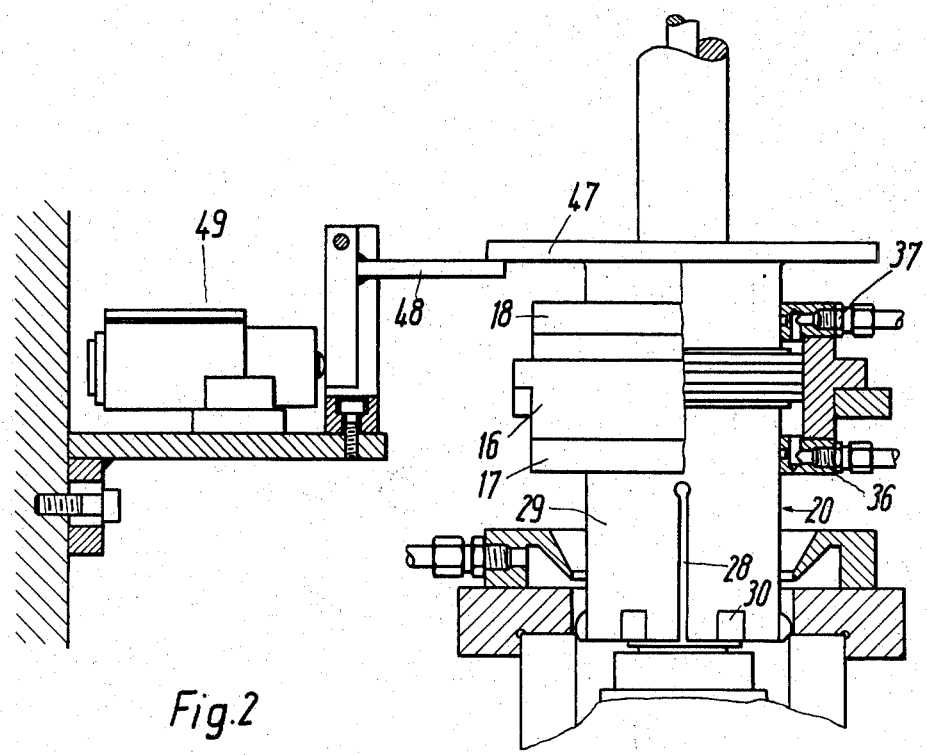
FIG. 2 is an axial section and partyial side view of the device of FIG. 1.

As shown in FIGS. 1 and 2, with the embodiment of the invention illustrated therein, the measuring and control device 1 according to the invention are coaxial to the workpiece 2 and to the spindle 3 which carries the work tool 4 and pertains to a non-illustrated machine tool.

In the specific instance illustrated, the work tool 4 receives a honing tool which through the intervention of a tool shaft 5 is fixedly connected to the spindle 3 of a honing machine or through universal joints while the spindle 3 is rotatably journalled in a spindle sleeve 43 or in a tool carriage and by means of a non-illustrated motor and a stepdown transmission is rotated. A further, for instance hydraulic drive, serves for an axial movement of the spindle sleeve 43 or the like through which the honing tool 4 is moved into the bore 6 of the workpiece and then is reciprocated in bore 6.

The measuring and control device 1 has a guiding device 7 which, by means of a flange disc-like holding member 8 is coaxially connected to an end collar 44 of the spindle sleeve 43. The guiding device 7 has for instance two guiding bars 9 which are axes parallel to the spindle 3, in other words, are vertical cylindrical guiding bars which by means of threaded sections 10 are adjustable in their longitudinal direction and are arrestable on the holding element 8. Displaceably mounted on the lower end of the guiding bars 9 is an annular disc-shaped support 10 which is provided with corresponding bores 11 for guiding on the guiding bars 9.

Between the top side of the support 10 and sleeve-shaped abutments 12, which are located above the top side of support 10 and are connected to the guiding bars 9, there are arranged helical pressure springs 13 extending around the guiding bars 9. By means of these springs 13, the support 10 is spring loaded in downward direction against abutments 14 which are connected to the lower ends of the guiding bar 9. The upper surface of the abutments 14 are formed by elastic discs 15 so that the abutting operation of the support 10 against the abutments 14 will be cushioned.

Centered in the bore of the disc-shaped support 10 is a cylinder bushing 16 which is non-flexibly connected to the support 10 by screws. The cylinder bushing 16 has its ends closed by annular disc-shaped cylinder covers 17, 18.

Displaceably mounted in the cylinder 16 is a hollow piston 19 located along the axis of the spindle 3, which piston 19 has one end protruding from the cylinder 16 in downward direction and forms a feeling or fitting body 20.

The support 10 has associated therewith an annular disc-shaped feeler position abutment 21 which is stationary relative to the work piece 2 and is located below the support 10. Abutment 21 is by means of a sleeve 22 provided at the bottom side of said abutment 21 connected to the upper annular disc-shaped part 23 of a workpiece clamping device 24. The abutment 21 for the feeler end position and also the upper part 23 of the clamping device 24 have bores 25 and 26 which are in alignment with the guiding bars 9 and the diameters of which are greater than the diameters of the abutments 40 so that the feeler bars can move unimpededly downwardly through the upper part 23.

The upper part 23 has its bottom side provided with a turned-out portion 27 for receiving the upper end of the workpiece 2 while the smallest diameter of the central bore of the upper part 23 exceeds the work piece bore 6 to such an extent that the feeler body 20 can unimpededly be moved against the upper end of the work piece 2.

The sleeve-shaped feeler and fitting body 20 is provided with at least one, preferably three, axial slots 28 which are uniformly distributed over the circumference and which extend to the lower and front end of the feeler body 20 so that the latter forms two spring arms 29 which can be elastically compressed to such an extent that the diameter of the feeler body 20 decreases.

The outer circumference of the lower end of the feeler body 20 has fastened thereto a plurality of preferably six feeler members 30 of hard metal or the like which are uniformly distributed over said circumference. The outer surfaces of said feeler members 30 are respectively formed by two sections 31 and 32 of which the lower sections are located in a common mantle surface of a cone the axis of which cone is located in the axis of the feeler or fitting body 20. The upper surface sections 32, which are adjacent to the sections 31, are located in a common convex crowned and curved mantle surface the axis of which is likewise located in the axis of the feeler body 20.

It is also possible to locate the outer surfaces 31, 32 of the feeler members 30 in mantle surfaces separated from each other in such a way that the axis of this mantle surface is located in a direction toward the pertaining feeler member 30 and in spaced relationship to the central axis of the feeler body 20 while the connecting plane between these two axes is expediently formed by a plane of symmetry of the pertaining feeler member 30. In the last mentioned instance, the feeler members 30 contact the upper end edge 33 of the workpiece bore 6 and the surface of the work piece bore 6 only at points.

FIGS. 1 and 2 show the measuring device 1 in a position which it occupies when the work tool 4 has moved into the work piece bore 6. In this position, the feeler members 30 have their surface sections 31 in engagement with the upper edge 33 of the workpiece bore 6 while being under a pressure which is determined by the differential pressure in the two cylinder chambers 34, 35 of the cylinder 16. The two cylinder chambers 34, 35 are acted upon by a pressure medium through connection 36, 37 in the pertaining cylinder covers 17, 18 while the upper cylinder chamber 35 receives higher pressure in conformity with said differential pressure than the lower cylinder chamber 34. In view of the pressure load of the feeler member 30 acting against the upper edge 33 of the work piece bore 6, the feeler body 20 is elastically compressed while the feeler pressure acting parallel to the work piece bore 6 through the cylinder 16, and the spring pressure acting through the spring arms 29 approximately radially with regard to the workpiece bore 6 are so tuned to each other that the feeler members 30 enter the workpiece bore 6 only and slide along the same with their surface sections 32 when the workpiece bore 6 in view of the machining with machining tool 4 has reached the desired end measurement.

By varying the differential pressure in the two cylinder chambers 34, 35, this end measurement can be varied by extremely slight amounts.

Figure 3:
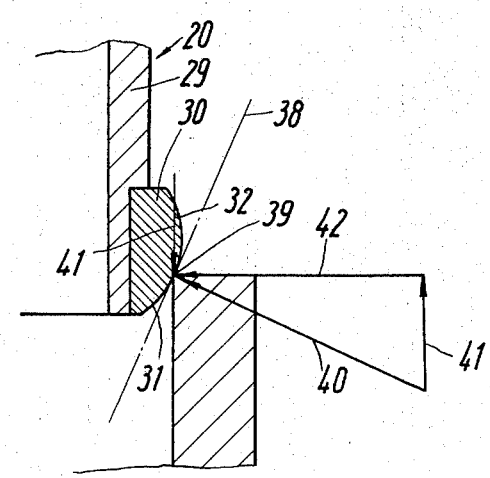
FIG. 3 shows the relationship of the forces in the feeling range on an enlarged scale.

As shown in FIG. 3, in view of the crowned ground area 32 and the conical group area 31 on each feeler member 30, there is obtained a force 40 which acts counter to the feeling force and at a right angle upon the tangent 38 in the point of contact 39 between the feeler member and the workpiece. This force 40 may be split into a vertical component 41 and a horizontal component 42, while the horizontal component 42, which tends to compress the feeler member 20, is by a multiple larger than the vertical component 41.

By means of the pneumatic and hydraulic suspension, according to the invention, of the feeler or fitting body 20, the feeling pressure can be precisely reproduced without steps or by steps so that the vertical force 41 which tends to press the feeler body 20 into the bore amounts to, for instance, 600 grams, 1,200 grams and 2,000 grams. In conformity with these different forces, the feeler body 20 will deflect more or less toward the inside which means that the feeler body 20 will center or later enter the work piece bore 6. As a result thereof, in conformity with the adjusted feeler pressures, different workpiece diameters are obtained so that in an extremely simple manner it is possible with a single feeler body to hone a plurality of measurement groups.

The force component 42 which may, for instance, be horizontal of the wedge effect occurring during the feeling contact, is directly proportional to the vertical feeler pressure 41.

During the upward movement of the tool 4, the abutments 14 abut the bottom side of the support 10 prior to the work tool 4 having reached the upper edge 33 of the workpiece bore 6 so that the feeler body 20 is lifted off the workpiece, and the work tool 4 can unimpededly move out of the upper end of the workpiece bore 6.

The guiding rods 9 are non-rotatably connected to the spindle sleeve 43 or the workpiece carriage.

During the downward movement of the work tool 4, the support 10 is carried off in downward direction until it abuts the feeler end abutment 21 and is pressed against the latter by springs 13. The force of the springs 13 is slightly greater than the maximum force at which the feeler body 20 contacts the work piece bore. In this way, it will be assured that during the downward movement of the work tool 4, the supporting plate 10 will safely rest upon the feeler end abutment 21 and that the annular piston 19 will get free from its lower abutment surface 45 by at least the amount which is required in the further course of the measuring operation to permit the feeler members 30 to enter the workpiece bore 6 and if necessary a control to be described further below may be released. The lower abutment surface 45 is formed by the lower cylinder cover 17.

Bores 11 in the support 10 are over the outer diameter of the guiding bars 9 greater by a slight amount to such an extent that the support 10 and thereby the feeler body 20 will during the downward stroke be able by a transverse displacement to bring themselves precisely and automatically into axial alignment with regard to the work piece bore 6.

The hollow piston 19 forms one piece with a bushing 46 which protrudes beyond the top side of the cylinder 16. Bushing 46 has its upper end provided with a flange-like ring 47. The path of movement of ring 47 is provided with an angle lever 48 located therebelow. Lever 48 is adapted to act upon a microswitch 49 which, with regard to the workpiece 2, is stationarily mounted on the machine. As soon as the feeler body 20 after reaching the end measurement enters the workpiece bore 6, ring 47 actuates the switch 49 by means of which the honing operation is turned off.

Instead of the embodiment shown in the drawings, in which the feeler head immerses from above into the workpiece, the arrangement may also be such that the feeler head immerses into the workpiece from below. In particular in this instance, it is expedient to arrange the measuring head 20 axially movable and limited on a measuring bridge corresponding for instance to plate 10. The measuring bridge is, by means of a lifting and lowering device, movable in guiding means rigidly arranged in the machine frame and is movable below the plane of the clamping table while advantageously an adjustable abutment is provided for limiting the return position of the measuring bridge into the measuring position so that during a fast and frequent workpiece exchange, the clamping in and releasing of the workpieces during mass fabrication will not be interfered with.

It is, of course, to be understood that the present invention is, by no means, limited to the particular show-

What is claimed is:

1. A measuring device for measuring surfaces of workpieces being machined, especially cylindrical surfaces; a holder moveable parallel to the surface being machined, a feeler body on said holder, a feeler member on said body, and feeler means on said feeler member engageable with the workpiece at a point of contact under predetermined first measuring pressure force adjacent said surface, said feeler member being moveably supported on said body for movement of said feeler means in a plane at an angle to said surface, said feeler member being resiliently biased against said body under predetermined second measuring pressure force in a direction to urge said feeler means toward said surface, and means to permit adjustment of relationship between both first and second measuring pressure forces, said feeler body comprising a piston reciprocable parallel to said surface and said feeler member being freely moveable approximately radially of a bore axis under predetermined second measuring pressure force and the first predetermined measuring pressure force parallel to the surface being machined being adjustable during continuous machine operation without standstill, said feeler member being a tubular member having one end fixed to said piston and projecting axially therefrom toward said workpiece, said tubular member having axial slots extending therein from the free end thereof opposite the end connected to said piston, said feeler means comprising feeler elements mounted on and projecting radially outwardly from the free end of said tubular member, the resilience of the arms of said tubular member formed by the said axial slots therein biasing said feeler elements toward said surface.

2. A measuring device according to claim 1 in which said holder includes a cylinder in which said piston is mounted, and means for supplying fluid under pressure to the opposite ends of said cylinder to control the engagement of said feeler elements with said workpiece.

3. A measuring device according to claim 1 in which said piston is also tubular and is coaxial with said tubular member.

4. A measuring device according to claim 1 in which said feeler elements are distributed about the periphery of the free end of said tubular member and each comprises an inclined ramp portion on the side facing said workpiece and a crowned portion adjacent the ramp portion.

5. A measuring device according to claim 1 in which said feeler elements are distributed about the periphery of the free end of said tubular member in alternating relation to the said slots therein, each said feeler element having an inclined ramp portion on the side facing said workpiece, said ramp portions being disposed substantially on the surface of a cone coaxial with said tubular member and having the apex toward said workpiece.

6. A measuring device according to claim 1 which includes a tool for machining said surface and guided for movement parallel to said surface, support means for said holder, connecting means connecting said support means to said tool for movement of said holder toward and away from said workpiece together with said tool, abutmemt means for engaging and stopping said support means with said feeler means adjacent said workpiece when said tool moves into working position relative to said surface, said connecting means including resilient means pressing said support means against said abutment means during continued movement of said tool, and means in said support means for urging said holder toward said workpiece with a predetermined force while said support means rests on said abutment means.

7. A measuring device according to claim 1 which includes a tool for machining said surface and guided for movement parallel thereto, support means for said holder, connecting means connecting said support means to said tool for movement of said holder toward and away from said workpiece together with said tool, said connecting means permitting a predetermined amount of body movement of said holder relative to said tool in a direction lateral to said surface.

8. A measuring device according to claim 1 which includes an actuating means connected to said feeler body, and an element adapted for actuation by said actuating means upon movement of said feeler means along said surface being machined and adapted for interrupting the machining of said surface.

9. A measuring device according to claim 1 which includes a honing tool of a honing machine for machining said surface, a machine frame supporting the workpiece and in which said tool is moveable parallel to said surface, a bridge resiliently connected to said holder, connecting means connecting the bridge to said tool for movement therewith, an abutment rigid with said frame and adapted abuttingly to engage said holder when said holder is advanced toward said workpiece together with said tool, said resilient means permitting said holder to dwell while said tool advances to machine said surface, and abutment means on said bridge for engaging said holder to withdraw said holder from said workpiece when said tool retracts from the workpiece.

* * * * *